(12) United States Patent
Coulmeau

(10) Patent No.: US 7,492,307 B2
(45) Date of Patent: Feb. 17, 2009

(54) COLLISION RISK PREVENTION EQUIPMENT FOR AIRCRAFT

(75) Inventor: François Coulmeau, Toulouse (FR)

(73) Assignee: Thales (FR)

( * ) Notice: Subject to any disclaimer, the term of this patent is extended or adjusted under 35 U.S.C. 154(b) by 0 days.

(21) Appl. No.: 11/686,345

(22) Filed: Mar. 14, 2007

(65) Prior Publication Data

US 2007/0222666 A1 Sep. 27, 2007

(30) Foreign Application Priority Data

Mar. 14, 2006 (FR) .................................. 06 02212

(51) Int. Cl.
| G01S 13/74 | (2006.01) |
| G01S 13/87 | (2006.01) |
| G01S 13/91 | (2006.01) |
| G01S 7/40  | (2006.01) |

(52) U.S. Cl. .............................. 342/32; 342/30; 342/29; 342/43; 342/165; 342/173

(58) Field of Classification Search ............. 342/29–32, 342/36–37, 454, 42–43, 146, 165, 173; 340/961; 343/715, 708; 701/120
See application file for complete search history.

(56) References Cited

U.S. PATENT DOCUMENTS

| 6,208,284 B1 * | 3/2001 | Woodell et al. ............... 342/30 |
| 6,681,158 B2 | 1/2004 | Griffith et al. |
| 6,690,296 B2 | 2/2004 | Corwin et al. |
| 6,810,322 B2 * | 10/2004 | Lai ............................. 701/120 |
| 6,967,616 B2 * | 11/2005 | Etnyre ......................... 342/182 |
| 7,116,266 B1 * | 10/2006 | Vesel et al. .................... 342/30 |
| 7,218,277 B1 * | 5/2007 | Smith ........................... 342/359 |
| 7,362,262 B2 * | 4/2008 | Murphy ................... 342/357.01 |
| 7,382,286 B2 * | 6/2008 | Cole et al. ................... 340/961 |
| 7,423,590 B2 * | 9/2008 | Smith ........................... 342/450 |
| 2006/0009909 A1 * | 1/2006 | Smith ........................... 701/301 |
| 2008/0211709 A1 * | 9/2008 | Smith et al. .................... 342/32 |

FOREIGN PATENT DOCUMENTS

WO 02/05246 A2 1/2002

* cited by examiner

*Primary Examiner*—Thomas H Tarcza
*Assistant Examiner*—Cassi Galt
(74) *Attorney, Agent, or Firm*—Lowe Hauptman Ham & Berner, LLP

(57) ABSTRACT

This equipment is of the TCAS type. In order to improve its integrity and the reliability of its measurements, its computing unit is provided with a cross-checking function carrying out the comparison between two values of a same parameter, for example a relative distance with respect to an intruder, one of them generated by its own estimating means and the other communicated by another TCAS equipment installed on the intruding aircraft and generating a discordance alarm in the case of the observed difference exceeding a tolerance threshold. The computing unit is provided with fault locating means locating the aircraft whose TCAS is faulty when in the presence of several intruding aircraft, by examining the observed differences in pairs of values of a same parameter established for each intruding aircraft.

12 Claims, 2 Drawing Sheets

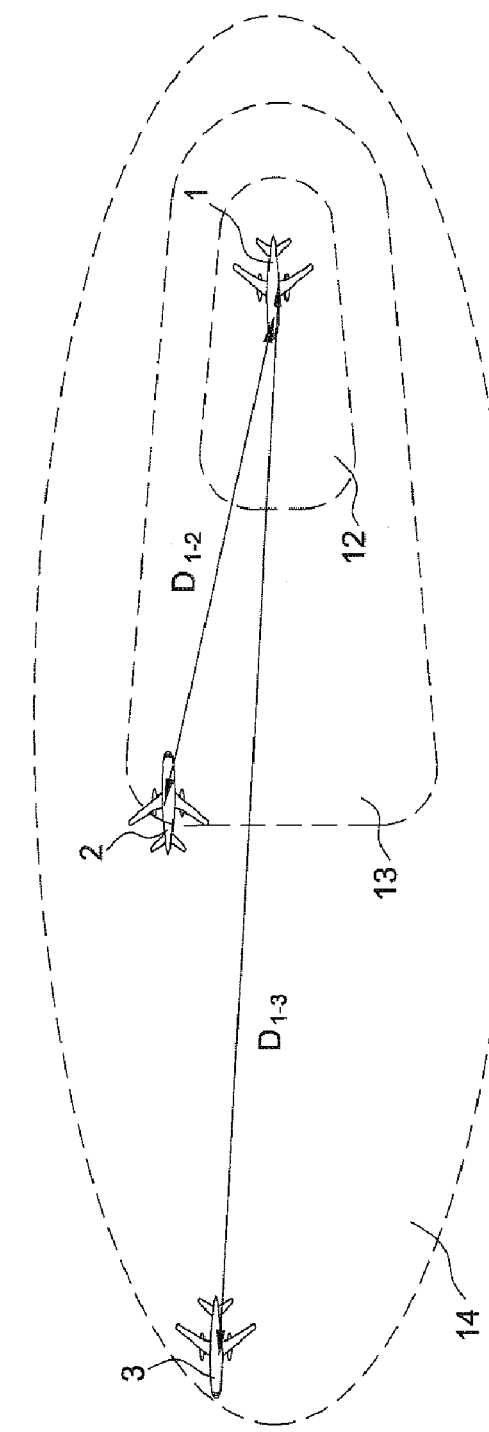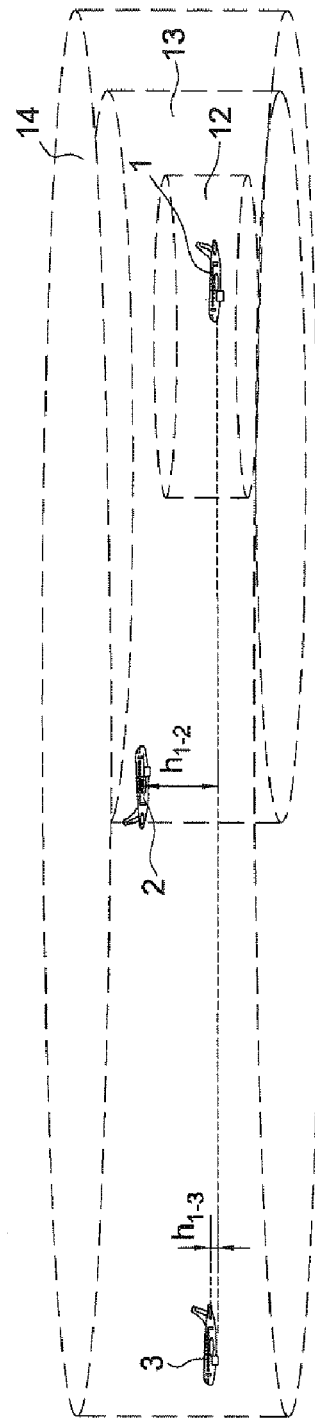

COLLISION RISK PREVENTION EQUIPMENT FOR AIRCRAFT

RELATED APPLICATIONS

The present application is based on, and claims priority from, France Application Number 0602212, filed Mar. 14, 2006, the disclosure of which is hereby incorporated by reference herein in its entirety.

FIELD OF THE INVENTION

The present invention relates to avionics and, more particularly, to flight management systems and in-flight collision avoidance systems.

BACKGROUND OF THE INVENTION

The TCAS (Traffic alert and Collision Avoidance System) is installed equipment used for warning a crew of a risk of in-flight collision with another aircraft and for giving it, in time, the information necessary for carrying out an avoidance maneuver. The necessity of such equipment became apparent in the 1950's, but it has taken several decades to achieve maturity in civil aviation. The TCAS in its current form dates from the 1980's and meets the ACAS standards established by the OACI (Organisation de l'Aviation Civile Internationale) and the regulation of the FAA (a government organization responsible for the regulation and control of civil aviation in the United States of America). It makes use of the installed SSR (Secondary Surveillance Radar) transponders responding to the interrogations of the secondary surveillance radars placed on the ground for cooperative air traffic control. These SSR transponders, whose use was made obligatory for all new aircraft of a certain weight or of a certain capacity (15 tonnes or 30 seats for the FAA, 5.7 tonnes or 19 seats for the OACI), correspond to a civil use of IFF (Identification Friend or Foe) systems which appeared during the Second World War.

The TCAS consists of an SSR interrogator associated with a computing unit. The installed SSR interrogator interrogates the SSR transponders installed on board other aircraft flying in the vicinity, whilst the computing unit situates the relative positions of the aircraft returning responses, in bearing using the directional properties of the system of receiving antennas of the SSR interrogator and in distance from the measured delays of the responses.

There are several versions of TCAS. The first version, TCAS 1, meets the ACAS 1 standard of the OACI. It is equipped with an SSR interrogator operating in mode C, that is to say adapted to SSR transponders responding only with an identifier and altitude data. It only provides traffic advisories TA (indications of heading and distance on a screen). The second version, TCAS II, meets the ACAS II standard of the OACI. It is equipped with an SSR interrogator operating in mode S, that is to say adapted to a more developed SSR transponder giving a more selective response provided with more data than mode C since it contains a registration number and supports data transmission. The second version TCAS II remains compatible with mode C. It provides traffic advisories TA, notices of resolution of collision risk RA solely in the vertical plane by means of anti-collision logic tracking targets in relative distance, relative bearing and altitude returned in the C and S mode responses, and coordination interrogations throughout the duration of a resolution advisory RA assuring the compatibility between the avoidance maneuvers of the two aircraft in question. This version is the one currently in use. A third version, the TCAS III, meeting the ACAS III standard of the OACI is foreseen for the future. It is a development of the TCAS II, providing notices of resolution of collision risk in the horizontal and vertical planes.

As TCAS equipments are general on aircraft as soon as they exceed a small transport capacity, it is envisaged to use them for reducing the separation distances on transoceanic routes or during instrument takeoffs as well as for establishing and maintaining the gaps between aircraft at the time of their final approaches.

Given the generalized presence of a satellite positioning receiver on board aircraft, it is also envisaged to use the capability of mode S to transmit data in order to make the on-board TCAS equipment communicate the GPS position of the aircraft to any SSR interrogator and in particular to an air traffic control center, which is advantageous for transoceanic flights.

Returning to transoceanic flights, an aircraft's knowledge of its current geographic location can be rather inaccurate because of an unavailability of its satellite positioning system, of sensor failures, of drifting of the inertial system or of the inertial system/GPS hybridization algorithms. Thus, an aircraft following a transoceanic route can see its estimated position deviate significantly from its real position. As it is rarely alone on a transoceanic route, its safety then depends entirely on its TCAS equipment which monitors its relative position with respect to aircraft flying in its vicinity. The integrity of the TCAS and the reliability of its measurements therefore become preponderant parameters.

SUMMARY OF THE INVENTION

It is an object of the present invention to improve the integrity of a TCAS equipment and the reliability of its measurements by comparison of measurements of the same type taken by the TCAS equipments responding to their interrogations.

The present invention is directed to an equipment, for an aircraft, for anticipating collision risks comprising an SSR secondary surveillance radar transponder supporting a data transmission channel, an SSR interrogator adapted to an SSR transponder and a computing unit provided with means for managing the SSR transponder and the SSR interrogator, estimation means for estimating the relative distances and bearings of the aircraft responding to the requests of the SSR interrogator, SSR interrogator request specifying means specifying requests for communication of estimated relative distance and/or of estimated relative bearing, SSR transponder response specifying means making it possible, on the request of an SSR interrogator of another aircraft flying in the vicinity, to include in the response given by the SSR transponder of the aircraft, a value of its relative distance and/or of relative bearing provided by the estimation means, said requests and responses being carried by the data transmission channel, concordance checking means for checking the concordance between the relative distance value and/or the relative bearing value of an aircraft provided by the estimation means and the value of relative distance and/or of relative bearing communicated by that aircraft by means of its SSR transponder and discordance alarm means triggered in the case of discordance detected by the concordance checking means.

Advantageously, the concordance checking means operate on the oblique distances.

Advantageously, the SSR interrogator request specifying means specify requests for communication of estimated relative distance and of estimated relative bearing; the SSR transponder response specifying means allow, on the request of an SSR interrogator of another aircraft flying in the vicinity, the inclusion in the response made by the SSR transponder of the aircraft of the values of its relative distance and of the relative bearing provided by the estimation means; and the concordance checking means operate simultaneously on the values of relative distance and on the values of bearing, given with respect to a common reference system, concerning a same aircraft.

Advantageously, the SSR interrogator request specifying means generate, at each triggering of the discordance alarm means, a vigilance request relayed by the SSR interrogator, communicating the alarm with the registration number of the aircraft which is at its source.

Advantageously, the computing unit also comprises fault locating means locating the faulty in-flight collision risk prediction equipment when there are more than two aircraft in the vicinity which are responding to the SSR interrogator and which are provided with in-flight collision risk anticipation equipments exchanging their discordance alarms via the data transmission channel.

Advantageously, the fault locating means carry out their locating by majority vote.

Advantageously, the SSR transponder response specifying means couple each communicated estimation of relative distance and/or of relative bearing with the registration numbers of the aircraft in question.

BRIEF DESCRIPTION OF THE DRAWINGS

Other features and advantages of the invention will emerge from the following description of an embodiment given by way of example. This description will be given with reference to the drawing in which:

FIGS. 2a and 2b are plan and side views showing the protection volumes of a conventional TCAS system and the relative distances whose measurements combined with those of the bearings and with altitude information communicated by aircraft flying in the vicinity of the carrier allow a conventional TCAS system to detect and resolve the collision risks and which are also used in a TCAS equipment according to the invention in order carry out cross-checks making it possible to ensure the integrity of the TCAS system and the reliability of its measurements.

DETAILED DESCRIPTION OF THE EMBODIEMENTS

Figure 1:
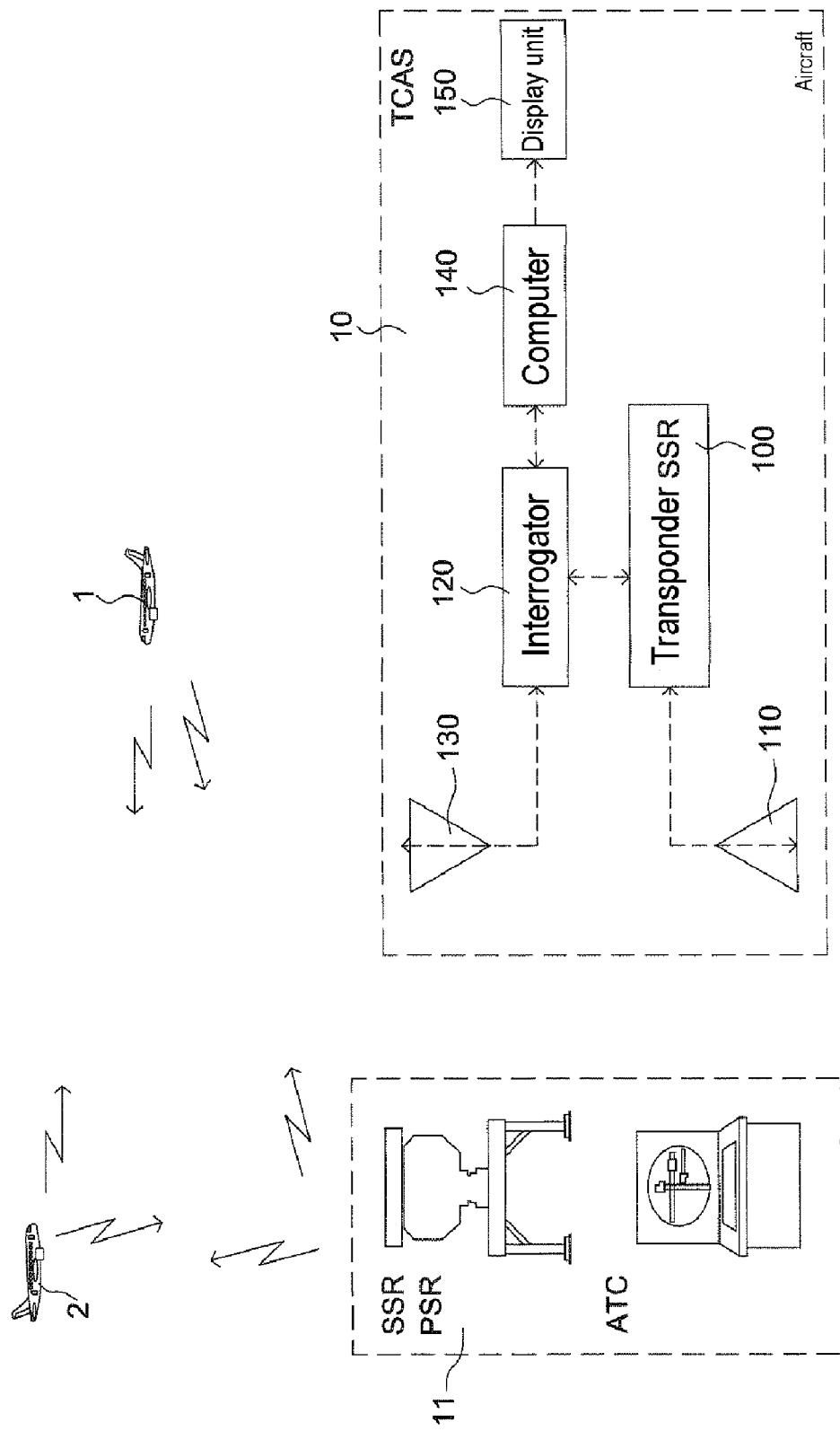
FIG. 1 is a block diagram of the TCAS system and of its integration with a cooperative air traffic surveillance system based on SSR secondary surveillance radars distributed on the ground.

As shown in FIG. 1, the air traffic surveillance from the ground is carried out in two complementary manners: a non-cooperative manner by means of PSR primary surveillance radars and a cooperative manner by means of secondary surveillance radars SSR.

Primary surveillance radars PSR locate flying objects by the echoes that they return when they are illuminated by a microwave frequency pulse coming from a directive beam sweeping the airspace. Some of them provide a determination of the position in 2D (distance and azimuth), others in 3D (distance, azimuth and elevation). They make it possible to determine the flight paths of aircraft using a target tracking technique consisting in following the successive positions detected for a same object. The analysis of the flight paths obtained allows the air controllers to monitor and warn of risks of aircraft collision with the ground and of risks of collision between aircraft without the necessity of cooperation of the aircraft and consequently disregarding the level of equipment of the latter, provided however that they are detectable or that they have been made detectable by the presence of a reflector radar.

Secondary surveillance radars SSR transmit trains of coded microwave frequency interrogation pulses to which the aircraft flying in the proximity respond by other trains of microwave frequency pulses encoded by means of an automatic and specific on-board equipment: "the SSR transponder". The interrogations are carried out at the frequency of 1.030 MHz and the responses are at 1.090 MHz according to different modes known as A, C or S. The receiver of the SSR radar is capable of giving the relative distance by measuring the time separating an interrogation and a response and the bearing of the SSR transponder at the origin of the response due to the directivities of its transmitting and receiving antennas. Other data is contained in the response of the SSR transponder of an aircraft such as: in mode A an identifier, in mode C an identifier and the pressure altitude, and in mode S, which supports a data transmission channel, a registration number followed by any flight data. Secondary surveillance radars SSR allow, like primary surveillance radars PSR, the determination of the flight paths of aircraft by target tracking techniques, in this case in distance, in azimuth and in altitude and consequently the prevention from the ground of risks of collision between aircraft and of risks of collision between the aircraft and the ground. They have the advantage, in comparison with the primary surveillance radars PSR of not being dependent on their sensitivity but they necessitate the cooperation of the aircraft flying in their vicinity.

As shown in FIG. 1, the antennas of the primary surveillance radars PSR and of the secondary surveillance radars SSR are often mounted on a same rotating structure placed on the ground in the proximity of or connected with an air traffic control center.

With regard to the risks of in-flight collision, there were firstly proposed systems on the ground, available to air traffic controllers, evaluating the risks of collision by automatic analyses of the flight paths derived from the data provided by the primary PSR and secondary SSR surveillance radars, such as for example the system called ATCRBS (Air Traffic Control Radar Beacon System) used in the United States of America. Then, in the 1960's, there appeared the necessity of completing this prevention carried out from the ground by the air traffic controllers, by prevention carried out on board aircraft and by autonomous on-board systems. In order to meet this need, it was proposed, in the 1970's, to have available on board aircraft an SSR interrogator capable of interrogating the SSR transponders installed on board aircraft flying in their vicinities and to associate with it an anti-collision logic capable of making use of its responses, a proposal which was the origin of the TCAS systems.

As shown in FIG. 1, a TCAS system 10 installed on board an aircraft shares with the cooperative surveillance by SSR radars system an SSR transponder 100 equipped with omnidirectional antennas 110 in order to respond to interrogations coming from any bearing whatsoever and comprises:

an SSR interrogator 120 equipped with transmitting and receiving antennas 130 having directional properties in reception allowing it to determine the bearing of the direction from which a response comes, a computer 140 managing the SSR transponder 100 and the SSR interrogator 120 and providing the anti-collision processing on the basis of information taken from the responses obtained coming from the SSR transponders of aircraft flying in the vicinity, and a display unit or alarm generator 150 delivering to the crew traffic information and possibly collision conflict resolution instructions.

In FIG. 1, two aircraft 1 and 2 equipped with SSR transponders and with TCAS systems are flying in the vicinity of each other and of an air traffic control station 11 equipped with primary radars PSR and with secondary radars SSR. They respond to the interrogations of the secondary radar SSR, mutually interrogate each other and analyze the responses given by the other both to their own interrogations and to those of the secondary radar SSR.

As shown in FIG. 2, the TCAS system of an aircraft 1 locates the aircraft 2, 3 flying in a close vicinity with respect to three volumes surrounding the aircraft:

- a first volume 12 associated with the aircraft 1 corresponding to the positions of an intruder justifying a resolution advisory RA of a collision risk within a period of the order of 25 seconds. This resolution advisory volume 12 extends over about 2.1 nautical miles in front of the aircraft and +/−850 feet above and below,
- a second larger volume 13 surrounding the first RA resolution advisory volume 12, corresponding to the positions of an intruder justifying a traffic advisory TA because of a risk of collision within a period of the order of 30 seconds. This traffic advisory volume 13 extends over about 3.1 miles in front of the aircraft and +/−1200 feet above and below, and
- a third, even larger, surveillance volume 14 surrounding the resolution advisory RA volume 12 and the traffic advisory TA volume 13 and corresponding to the volume formed by the range of a transmission system constituted by an SSR interrogator and an SSR transponder. This transmission range volume 14, which depends on the radiation diagram of the antennas of the SSR interrogator and on the transmitted powers, extends over 14 to 30 nautical miles in front of the aircraft and +/−10,000 feet above or below.

The TCAS system determines the relative positions of the aircraft flying in the vicinity from their relative oblique distances measured by the intermediary of the response times of their SSR transponders, of their relative bearings assimilated to the directions from which come the responses of their SSR transponders and of their pressure altitudes communicated in the responses of their SSR transponders. From the determinations of successive relative positions carried out with a periodicity of the order of one second or more, it estimates the flight paths and relative speeds of the aircraft flying in the vicinity and from them derives the relative positions of the CPA (Closest Point of Approach) points of these flight paths. If these CPA points enter a protection volume extending around the flight path of the aircraft of +/−1200 feet vertically and from 0.1 to 1 nautical mile laterally for a traffic advisory TA and +/−300 feet vertically and 0.06 to 0.12 nautical miles laterally for a resolution advisory RA, it monitors the penetration, by the time remaining for the intruding aircraft to reach the CPA point of its flight path, with a minimum threshold of 20 to 45 seconds to transmit a traffic advisory TA or of 20 to 30 seconds to transmit a resolution advisory RA.

The resolution advisory which is a very strong incitement to climb or to descend coming from anti-collision logic of the computer 140 taking account of the situation at the time, accompanies the transmission by the SSR interrogator 120 of coordination interrogations intended to make the avoidance reaction of a possible TCAS system equipping the intruding aircraft compatible.

As recalled previously, an aircraft carrying out a transoceanic flight may have only a rather inaccurate knowledge of its current geographic location as a result of an unavailability of its satellite positioning system, failures of sensors, drifting of the inertial system or of the inertial system/GPS hybridization algorithms, etc. Given the absence of traffic regulation by a ground control in the transoceanic regions, its safety with respect to collision depends entirely on its TCAS equipment whose integrity and the reliability of its measurements therefore become preponderant parameters.

The information upon which the TCAS system is based:

- the delay of the response $t_{i-n}$ of the SSR transponder of an intruding aircraft n at the SSR interrogator of the aircraft in question i (the forward and return time of the waves increased by a known processing time within the SSR transponder),
- the relative altitude $h_{i-n}$ of the intruding aircraft n with respect to the aircraft in question i which is a difference between the pressure altitudes measured by devices with different barometric calibrations, and
- the relative bearing $\alpha_{i-n}$ of the intruding aircraft n with respect to the aircraft in question i. are marred by inaccuracies. A small inaccuracy of a few milliseconds over the traveling time of a wave can signify a great distance. Thus, in the absence of long range radio communication means and in the case of unavailability of satellite positioning means, a location inaccuracy can be accompanied by inaccuracies in the relative positions between aircraft flying in close space, provided by the TCAS system and increasing collision risks.

Similarly, in the past, failures of the TCAS system have generated confusion and false alarms, due for example to stuck bits in the hardware, making the TCAS interrogator think that an aircraft situated well below it was at the same altitude or not detecting one aircraft in front of another (for example 20 Apr. 2005 between a Cessna and a B737 at New York). A resolution requesting the aircraft below the interrogator aircraft to climb caused a large collision risk.

Finally, false TCAS alarms due to the dynamics of the aircraft in the vertical plane have led to chained alarms (for example in Switzerland on 13 Sep. 2000).

In order to guarantee its integrity and the reliability of its measurements, the proposed TCAS system is provided with a function of cross-checking relative distance values which it generates with those generated by the TCAS systems of the interrogated aircraft flying in the vicinity. This cross-checking function used by its computer 140 consists in requesting the SSR transponder of each aircraft in the vicinity having responded to an interrogation to provide its relative distance calculated by the TCAS system associated with the SSR transponder in question and then in comparing the relative distance communicated with the calculated value and transmitting a non-integrity alarm in the case of too great a difference.

For example, with two aircraft A1 and A2, each aircraft can exchange its information and have the availability of:

- the relative distance $D_{1-2}$ between the aircraft A1 and A2, evaluated by the TCAS system of the aircraft A1 from the oblique distance measured by the response time $t_{1-2}$ of the SSR transponder of the aircraft A2 to the SSR interrogator of the aircraft A1 and from the difference $h_{1-2}$ between the pressure altitude of the aircraft A2 communicated to the TCAS system of the aircraft A1 by the SSR transponder of the aircraft A2 and the pressure altitude of the aircraft A1 provided by its on-board instruments,
- the relative distance $D_{2-1}$ between the aircraft A1 and A2, evaluated by the TCAS system of the aircraft A2 from the oblique distance measured by the response time $t_{2-1}$ of the SSR transponder of the aircraft A1 to the SSR interrogator of the aircraft A2 and from the difference $h_{2\text{-}1}$ between the pressure altitude of the aircraft A1 communicated to the TCAS system of the aircraft A2 by the SSR transponder of the aircraft A1 and the pressure altitude of the aircraft A2 provided by its on-board instruments, these relative distances being evaluated at a same time or by a forward and return of requests taking a few thousandths or hundredths of a second, by means of time synchronization.

If the absolute difference $\|D_{1\text{-}2}-D_{2\text{-}1}\|$ is greater than a tolerance threshold, there is a problem and an alarm can be transmitted for both aircraft.

From three aircraft A1, A2 and A3, it is possible to carry out a majority vote in order to determine the TCAS system of that one of the aircraft that presents a problem. In fact, given that:

$D_{1\text{-}2}$ is the relative distance between the aircraft A1 and A2, evaluated by the TCAS system of the aircraft A1 from the oblique distance measured by the response time $t_{1\text{-}2}$ of the SSR transponder of the aircraft A2 to the SSR interrogator of the aircraft A1 and from the difference $h_{1\text{-}2}$ between the pressure altitude of the aircraft A2 communicated to the TCAS system of the aircraft A1 by the SSR transponder of the aircraft A2 and the pressure altitude of the aircraft A1 provided by its on-board instruments, $D_{1\text{-}3}$ is the relative distance between the aircraft A1 and A3, evaluated by the TCAS system of the aircraft A1 from the oblique distance measured by the response time $t_{1\text{-}3}$ of the SSR transponder of the aircraft A3 to the SSR interrogator of the aircraft A1 and from the difference $h_{1\text{-}3}$ between the pressure altitude of the aircraft A3 communicated to the TCAS system of the aircraft A1 by the SSR transponder of the aircraft A3 and the pressure altitude of the aircraft A1 provided by its on-board instruments, $D_{2\text{-}1}$ is the relative distance between the aircraft A1 and A2, evaluated by the TCAS system of the aircraft A2 from the oblique distance measured by the response time $t_{2\text{-}1}$ of the SSR transponder of the aircraft A1 to the SSR interrogator of the aircraft A2 and from the difference $h_{2\text{-}1}$ between the pressure altitude of the aircraft A1 communicated to the TCAS system of the aircraft A2 by the SSR transponder of the aircraft A1 and the pressure altitude of the aircraft A2 provided by its on-board instruments, $D_{2\text{-}3}$ is the relative distance between the aircraft A2 and A3, evaluated by the TCAS system of the aircraft A2 from the oblique distance measured by the response time $t_{2\text{-}3}$ of the SSR transponder of the aircraft A3 to the SSR interrogator of the aircraft A2 and from the difference $h_{2\text{-}3}$ between the pressure altitude of the aircraft A3 communicated to the TCAS system of the aircraft A2 by the SSR transponder of the aircraft A3 and the pressure altitude of the aircraft A2 provided by its on-board instruments, $D_{3\text{-}1}$ is the relative distance between the aircraft A1 and A3, evaluated by the TCAS system of the aircraft A3 from the oblique distance measured by the response time $t_{3\text{-}1}$ of the SSR transponder of the aircraft A1 to the SSR interrogator of the aircraft A3 and from the difference $h_{3\text{-}1}$ between the pressure altitude of the aircraft A1 communicated to the TCAS system of the aircraft A3 by the SSR transponder of the aircraft A1 and the pressure altitude of the aircraft A3 provided by its on-board instruments, $D_{3\text{-}2}$ is the relative distance between the aircraft A2 and A3, evaluated by the TCAS system of the aircraft A3 from the oblique distance measured by the response time $t_{3\text{-}2}$ of the SSR transponder of the aircraft A2 to the SSR interrogator of the aircraft A3 and from the difference $h_{3\text{-}2}$ between the pressure altitude of the aircraft A2 communicated to the TCAS system of the aircraft A3 by the SSR transponder of the aircraft A2 and the pressure altitude of the aircraft A3 provided by its on-board instruments, the comparisons of the absolute differences $\|D_{2\text{-}1}-D_{1\text{-}2}\|$, $\|D_{3\text{-}1}-D_{1\text{-}3}\|$ and $\|D_{2\text{-}3}-D_{3\text{-}2}\|$ with respect to a tolerance threshold makes it possible to detect and locate a TCAS system problem.

When the three absolute differences are less than the tolerance threshold, the TCAS systems of the three aircraft are functioning correctly.

When the absolute differences $\|D_{2\text{-}1}-D_{1\text{-}2}\|$ and $\|D_{3\text{-}1}-D_{1\text{-}3}\|$ between the relative distance values between the aircraft A1, A2 and A1, A3 comply with the tolerance threshold but not the absolute difference $\|D_{2\text{-}3}-D_{3\text{-}2}\|$ between the relative distance values between the aircraft A2 and A3, then there is a relative positioning problem between the aircraft A2 and A3 but it is not possible to further locate the problem by this single cross-check, which results in causing the transmission of integrity alarms by the TCAS systems of the aircraft A2 and A3.

When the absolute differences $\|D_{2\text{-}1}-D_{1\text{-}2}\|$ and $\|D_{3\text{-}2}-D_{1\text{-}3}\|$ between the relative distance values between the aircraft A1, A2 and A2, A3 comply with the tolerance threshold but not the absolute difference $\|D_{3\text{-}1}-D_{1\text{-}3}\|$ between the relative distance values between the aircraft A1 and A3, then there is a relative positioning problem between the aircraft A1 and A3 but it is not possible to further locate the problem by this single cross-check, which results in causing the transmission of integrity alarms by the TCAS systems of the aircraft A1 and A3.

When the absolute differences $\|D_{3\text{-}1}-D_{1\text{-}3}\|$ and $\|D_{2\text{-}3}-D_{3\text{-}2}\|$ between the relative distance values between the aircraft A1, A3 and A2, A3 comply with the tolerance threshold but not the absolute difference $\|D_{2\text{-}1}-D_{1\text{-}2}\|$ between the relative distance values between the aircraft A1 and A2, then there is a relative positioning problem between the aircraft A1 and A2 but it is not possible to further locate the problem by this single cross-check, which results in causing the transmission of integrity alarms by the TCAS systems of the aircraft A1 and A2.

When the absolute difference $\|D_{2\text{-}1}-D_{1\text{-}2}\|$ between the relative distance values between the aircraft A1, A2 complies with the tolerance threshold but not the absolute differences $\|D_{2\text{-}3}-D_{3\text{-}2}\|$ and $\|D_{3\text{-}1}-D_{1\text{-}3}\|$ between the relative distance values between the aircraft A2, A3 and A1, A3, then the aircraft A3 has relative positioning problems whilst the others A1 and A2 do not have problems between them, which shows that the problem is located in the TCAS system of the aircraft A3 and results in causing the transmission of an integrity alarm solely by the TCAS system of the aircraft A3.

When the absolute difference $\|D_{3\text{-}1}-D_{1\text{-}3}\|$ between the relative distance values between the aircraft A1, A3 complies with the tolerance threshold but not the absolute differences $\|D_{2\text{-}1}-D_{1\text{-}2}\|$ and $\|D_{2\text{-}3}-D_{3\text{-}2}\|$ between the relative distance values between the aircraft A1, A2 and A2, A3, then the aircraft A2 has relative positioning problems whilst the others A1 and A3 do not have problems between them, which shows that the problem is located in the TCAS system of the aircraft A2 and results in causing the transmission of an integrity alarm solely by the TCAS system of the aircraft A2.

When the absolute difference $\|D_{2-3}-D_{3-2}\|$ between the relative distance values between the aircraft A2, A3 complies with the tolerance threshold but not the absolute differences $\|D_{2-1}-D_{1-2}\|$ and $\|D_{3-1}-D_{1-3}\|$ between the relative distance values between the aircraft A1, A2 and A1, A3, then the aircraft A1 has relative positioning problems whilst the others A2 and A3 do not have problems between them, which shows that the problem is located in the TCAS system of the aircraft A1 and results in causing the transmission of an integrity alarm solely by the TCAS system of the aircraft A1.

When the three absolute differences do not comply with the tolerance threshold, then there is a relative positioning problem between the three aircraft A1, A2 and A3 but it is not possible to locate it better by this single cross-check, which results in causing the transmission of integrity alarms by the TCAS systems of all three aircraft A1, A2 and A3.

These various cases are summarized in the following table:

| $\|D_{2-1}-D_{1-2}\|$ | $\|D_{3-1}-D_{1-3}\|$ | $\|D_{2-3}-D_{3-2}\|$ | Alarm A1 | Alarm A2 | Alarm A3 |
|---|---|---|---|---|---|
| <threshold | <threshold | <threshold | | | |
| <threshold | <threshold | >threshold | | X | X |
| <threshold | >threshold | <threshold | X | | X |
| >threshold | <threshold | <threshold | X | X | |
| <threshold | >threshold | >threshold | | | X |
| >threshold | <threshold | >threshold | | X | |
| >threshold | >threshold | <threshold | X | | |
| >threshold | >threshold | >threshold | X | X | X |

From four aircraft, it is possible to obtain a much finer discrimination of the TCAS system or systems whose integrity raises a problem and even to improve that discrimination statistically.

Rather than the relative horizontal distances between aircraft, the cross-checking function can be applied to the oblique relative distances which are measured directly by the TCAS system without making use of the pressure altitudes provided by the barometric altimeters. It can also be applied to the relative bearings of the aircraft flying in the vicinity. It is then advantageous for it to require from the interrogated aircraft flying in the vicinity the communication, in an absolute reference system, of the relative bearing at which it sees the aircraft which is interrogating it in order to facilitate the comparisons in a common reference system.

The implementation of the cross-checking function which has just been described is carried out in the computer 140 of the TCAS system. The latter is provided with:

means for managing the SSR transponder 100 and the SSR interrogator 120, means for estimating the relative distances and bearings of the aircraft responding to the requests of the SSR interrogator, means for specifying a request for the SSR interrogator 120, means for specifying a response of the transponder SSR 100, means for checking the concordance between the relative distance value of an aircraft provided by the estimating means and the relative distance value communicated by that aircraft by means of its SSR transponder, discordance alarm means triggered in the case of discordance detected by the checking means transmitting by means of the SSR transponder 100 a discordance alarm message identifying the aircraft concerned, and fault locating means analyzing the discordance messages in order to locate the failed TCAS system or systems from the analysis of cases listed in the above table.

The request specification means generate, for the interrogator 110, requests for communication of the estimations of relative distance carried out by the TCAS systems of the aircraft that have just responded to a normal interrogation of the SSR interrogator 110 making use of the data transmission uplink made available by mode S.

The response specification means generate the responses of the SSR transponder 100 communicating, at the specific request of an SSR interrogator of another aircraft 2, 3 flying in the vicinity, the requested relative distance estimations, making use of the data transmission uplink made available by mode S.

The concordance checking means compare with a tolerance threshold the absolute differences between the estimations of a same value: oblique or horizontal relative distance, relative bearing taken by the two aircraft in question and, in the case of non-compliance with the tolerance threshold, triggers the discordance alarm means.

The means for specification of request and response are adapted to the handling of the values used for the cross-checks.

The invention claimed is:

1. Equipment, for aircraft, for anticipating collision risks comprising:

an SSR transponder supporting a data transmission channel, an SSR interrogator adapted to an SSR transponder, a computing unit provided with:

means for managing the SSR transponder and the SSR interrogator, estimation means for estimating the relative distances and bearings of aircrafts responding to the requests of the SSR interrogator, SSR interrogator request specifying means specifying requests for communication of estimated relative distance and/or of estimated relative bearing, SSR transponder response specifying means for making it possible, on the request of an SSR interrogator of another aircraft flying in the vicinity, to include in the response given by the SSR transponder of the aircraft, a value of relative distance and/or of relative bearing provided by the estimation means, said specific requests and responses being carried by the data transmission channel, Concordance checking means for checking the concordance between the relative distance value and/or the relative bearing value of an aircraft provided by the estimation means and the value of relative distance and/or of relative bearing communicated by that aircraft by means of its SSR transponder, and discordance alarm means that, in the case of discordance detected by the concordance checking means, provokes the generation of a discordance alarm message by the SSR transponder response specifying means, relayed by the SSR interrogator and containing the registration number of the aircraft which is at its source.

2. The equipment as claimed in claim 1, wherein the concordance checking means operate on oblique distances.

3. The equipment as claimed in claim 1, wherein the SSR interrogator request specifying means specify requests for communication of estimated relative distance and of estimated relative bearing, wherein the SSR transponder response specifying means allow, on the request of an SSR interrogator of another aircraft flying in the vicinity, the inclusion in the response made by the SSR transponder of the aircraft of the values of its relative distance and of the relative bearing provided by the estimation means; and wherein the concordance checking means operate simultaneously on the values of relative distance and on the values of bearing, given with respect to a common reference system, concerning a same aircraft.

4. The equipment as claimed in claim 1, wherein the computing unit also comprises fault locating means locating the faulty in-flight collision risk prediction equipment when there are more than two aircraft in the vicinity which are responding to the SSR interrogator and which are provided with in-flight collision risk anticipation equipments exchanging their data via the data transmission channel.

5. The equipment as claimed in claim 4, wherein the fault locating means carry out their locating by majority vote.

6. The equipment as claimed in claim 1, wherein the SSR transponder response specifying means couple each estimation of relative distance and/or of relative bearing with the registration numbers of the aircraft in question.

7. Equipment for aircraft, for anticipating collision risks comprising:
  an SSR transponder supporting a data transmission channel,
  an SSR interrogator adapted to an SSR transponder, and
  a computing unit provided with:
    means for managing the SSR transponder and the SSR interrogator,
    estimation means for estimating the relative distances and bearings of aircrafts responding to the requests of the SSR interrogator,
    SSR interrogator request specifying means specifying requests for communication of estimated relative distance and/or of estimated relative bearing,
    SSR transponder response specifying means for making it possible, on the request of an SSR interrogator of another aircraft flying in the vicinity, to include in the response given by the SSR transponder of the aircraft, a value of relative distance and/or of relative bearing provided by the estimation means, said specific requests and responses being carried by the data transmission channel,
    concordance checking means for checking the concordance between the relative distance value and/or the relative bearing value of an aircraft provided by the estimation means and the value of relative distance and/or of relative bearing communicated by that aircraft by means of its SSR transponder,
    discordance alarm means triggered in the case of discordance detected by the concordance checking means and
    fault locating means locating a faulty in-flight collision risk prediction equipment when there are more than two aircrafts in the vicinity which are responding to the SSR interrogator and which are provided with in-flight collision risk anticipation equipments exchanging their data via the data transmission channel.

8. The equipment as claimed in claim 7, wherein the concordance checking means operate on oblique distances.

9. The equipment as claimed in claim 7, wherein the SSR interrogator request specifying means specify requests for communication of estimated relative distance and of estimated relative bearing,
  wherein the SSR transponder response specifying means allow, on the request of an SSR interrogator of another aircraft flying in the vicinity, the inclusion in the response made by the SSR transponder of the aircraft of the values of its relative distance and relative bearing provided by the estimation means; and
  wherein the concordance checking means operate simultaneously on the values of relative distance and on the values of bearing, given with respect to a common reference system, concerning a same aircraft.

10. The equipment as claimed in claim 7, wherein the SSR transponder response specifying means generate, at each triggering of the discordance alarm means, a discordance alarm message relayed by the SSR interrogator and containing the registration number of the aircraft which is at its source.

11. The equipment as claimed in claim 7, wherein the fault locating means carry out their locating by majority vote.

12. The equipment as claimed in claim 7, wherein SSR transponder response specifying means couple each estimation of relative distance and/or of relative bearing with registration numbers of the aircraft in question.

* * * * *